Oct. 1, 1940.
G. MOUNTJOY
2,216,540
LOW CAPACITY ANTENNA COUPLING NETWORK
Filed Sept. 17, 1938
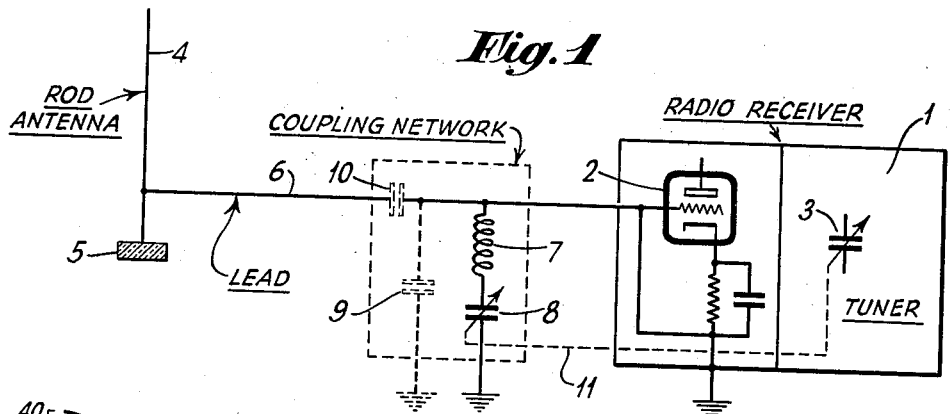
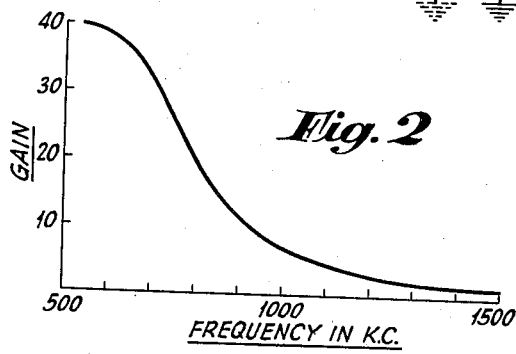
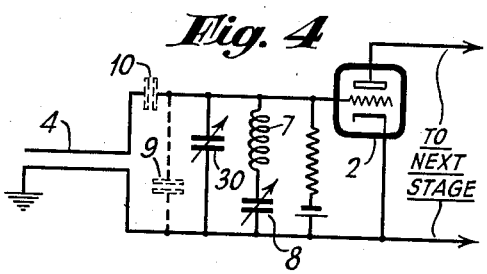
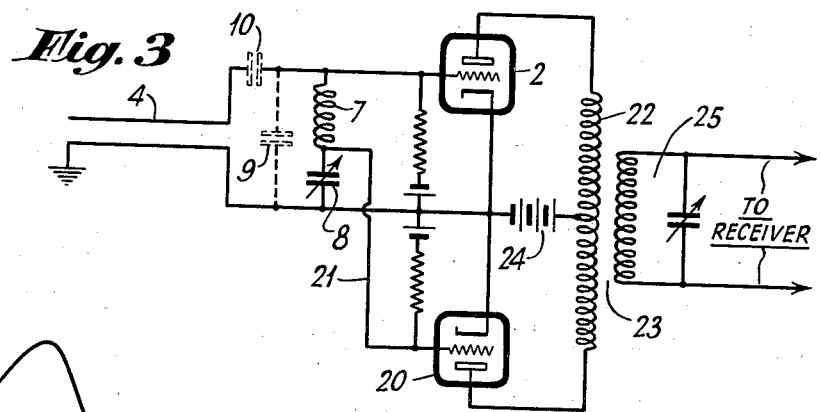
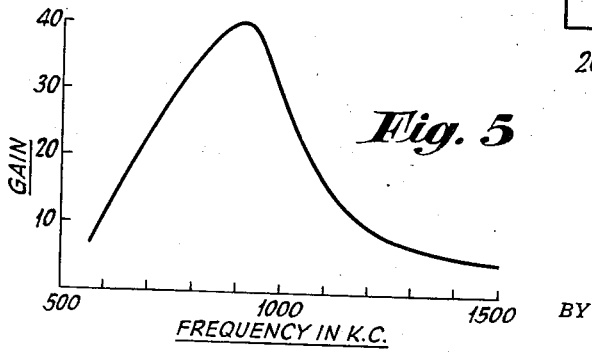
INVENTOR.
GARRARD MOUNTJOY
BY
H. S. Grover
ATTORNEY.

Patented Oct. 1, 1940

2,216,540

UNITED STATES PATENT OFFICE 2,216,540

LOW CAPACITY ANTENNA COUPLING NETWORK

Garrard Mountjoy, Manhasset, N. Y., assignor to Radio Corporation of America, a corporation of Delaware Application September 17, 1938, Serial No. 230,382

7 Claims. (Cl. 250—20)

My present invention relates to coupling networks for low capacity antennas, and more particularly to improved and highly efficient coupling arrangements adapted for use with antennas of the rod type commonly employed in automobiles for radio reception.

Automobile antennae, or signal collectors, generally can be grouped into two categories. Signal collectors of the type located close to the chassis of the automobile generally have a high capacity, but have a minimum of signal voltage induced by virtue of the fact that they do not extend a sufficient distance into the air. On the contrary, signal collectors of the rod type collect a maximum of signal voltage, but on the other hand they have a small capacity with respect to the automobile chassis. Now, when such a low capacity signal collector is coupled to the input electrodes of the conventional automobile radio receiver, it is found that there occurs a serious loss of signal intensity at the low frequency end of the receiver tuning range. This is readily explained by the fact that with direct coupling the gain between the rod antenna and the input electrodes of the first tube is the product of the percentage coupling and the Q (where Q is equal to $$\frac{\omega L}{r})$$

of the coupling network.

Where the rod antenna is coupled across the usual parallel tunable circuit of the first tube of the receiver, it can be shown that the percentage coupling will vary to a considerable extent. In fact, the variation is so marked that at the low frequency end of the tuning range the gain of the coupling network is very small. When it is realized that most of the well known broadcast stations are located at the low frequency end of the tuning spectrum, it will be appreciated that it is essential to employ as a coupling network for a rod antenna, a circuit which will increase the gain for the low frequency end of the tuning range.

Accordingly, it may be stated that it is one of the main objects of my present invention to provide a coupling network adapted for use between a low capacity antenna and the first tube of a radio receiver, and wherein the coupling network is constructed in such a manner that it functions as an inductive reactance over the receiver tuning range whereby the percentage coupling between the antenna and receiver is substantially constant over the said range.

Another important object of my invention may be stated to reside in the provision of a highly efficient coupling network for use in automobile radio receivers, and which is particularly constructed to couple a rod antenna to the receiver so as to maintain a high gain at least at the low frequency end of the receiver tuning range.

Another object of the invention is to provide the merits of inductive tuning without the use of a variable inductor, and to bring this about through the opposition of a capacity reactance variable with a fixed inductive reactance in series thereto; a rod antenna being directly coupled to this said effective inductance to provide high percentage coupling with resulting high gain.

Another object of my invention is to provide a coupling network for use between a rod antenna and a first tube of a radio receiver of the type commonly employed for automobiles; the coupling network comprising an inductance and adjustable condenser in series relation between the grid and cathode of the first tube, and the series elements cooperating with the capacities of the rod and the lead-in to resonate the coupling network to the desired signal frequency; the adjustable condenser functioning to adjust the essentially inductive reactance of the coupling network to different values thereby to resonate the network to different frequencies of the receiver tuning range.

Still other objects of my invention are to improve generally the efficiency and simplicity of coupling networks for use with low capacity antennas, and more especially to provide a coupling network which is capable of reliable and efficient performance in connection with an automobile receiver using a rod antenna.

The novel features which I believe to be characteristic of my invention are set forth in particularity in the appended claims; the invention itself, however, as to both its organization and method of operation will best be understood by reference to the following description taken in connection with the drawing in which I have indicated diagrammatically several circuit organizations whereby my invention may be carried into effect.

In the drawing:

Fig. 1 schematically illustrates a system embodying the present invention,

Fig. 2 graphically illustrates the gain-frequency characteristic of the coupling network in Fig. 1, Fig. 3 schematically shows a modified circuit arrangement, Fig. 4 shows still another modification, Fig. 5 graphically illustrates the gain-frequency characteristic of the circuit modification shown in Fig. 4.

Referring now to the accompanying drawing, wherein like reference characters in the different figures indicates similar circuit elements, there is shown in Fig. 1, in purely conventional form since those skilled in the art are fully aware of the constructional details of such apparatus, a radio receiver which is indicated by the reference numeral 1. The receiver may be of any desired type. If it is of the superheterodyne type then the first tube will either be a tunable radio frequency amplifier, or it will be the first detector tube. In any event it is to be understood that the numeral 2 designates the first signal transmission tube of the radio receiver, and that the numeral 3 designates the tuning condensers usually employed to tune the receiver over the desired tuning range. This tuning range may be the broadcast band of 500 to 1500 kc.

The tube 2 is shown as including at least a cathode, control grid and plate, and the cathode is shown as being connected to ground through the usual self-biasing network. Ground is, of course, the chassis of the automobile. The numeral 4 denotes the signal collector, and in the present case it is a rod antenna. Such antenna projects into the air and away from the body of the car, and while having maximum signal voltage induced therein, yet possesses a very low capacity with respect to ground. The antenna 4 is shown as being supported at one end thereof by some insulation element 5.

The numeral 6 designates the usual lead-in wire connecting the grid of tube 2 to the rod antenna 4. As stated above, if the antenna 4 were coupled to the input electrodes of tube 2 by a parallel resonant tunable circuit, as is usually the case, the signal transfer would be very poor at the low frequency end of the tuning range because the percentage coupling would decrease greatly at the low frequency end of the range. This follows from the fact that the percentage coupling between the rod antenna and the input electrodes of the first tube bears an inverse relation to the capacity of the shunt variable condenser, and that at the low frequency end of the tuning range the shunt variable condenser, assuming one were to be used, would have maximum capacity value.

According to the present invention, however, the variation of percentage coupling between the rod antenna and the input electrodes of the first tube is substantially eliminated. This is accomplished by coupling the rod antenna to the input electrodes of tube 2 by means of a coupling network which is essentially inductive in nature. The magnitude of the inductive reactance is varied by means of a small series capacity. Hence, the grid of tube 2 is connected to ground through a path including a coil 7 in series with the small adjustable condenser 8. Within the dotted rectangle designated "Coupling network" there is also shown in shunt to the series element 7—8 the distributed capacity 9 existing between the conductor 6 and ground. The numeral 10 denotes the series capacity of the rod antenna 4. Both capacities 9 and 10 are shown in dotted lines to illustrate the fact that they are inherent.

Adjustment of the condenser 8 varies the magnitude of the inductive reactance of the coupling network. The entire network 9—10—7—8 is resonant as a whole to the desired signal carrier frequency. The dotted line 11 denotes the usual uni-control mechanism which is employed to vary the condenser 8 synchronously with the tuning condensers 3. Of course, the rotors of condenser 8 will be shaped for tracking with the rotors of condenser 3, and it is believed that those skilled in the art at this time are fully aware of the manner in which such tracking is to be accomplished.

To illustrate the efficiency of the coupling network employed in the present invention, let it be assumed that the capacity of antenna 4 is 11 mmf., and that the shunt capacity 9 is 30 mmf. With such values of capacity, and using a magnitude of approximately 745 mh. for coil 7, it was found that a gain of 40 was secured when tuning to 600 kc.; a gain of 15.3 being secured at 800 kc. Fig. 2 illustrates in a purely qualitative manner the type of "gain-frequency" response characteristic possessed by the coupling network shown in Fig. 1. It will be noted that the gains secured at the low frequency end of the broadcast band are exceedingly high. It can be pointed out that the condenser 8 can be chosen of the 10 to 410 mmf. type. Ideally the inductance of coil 7 should have a low distributed capacity and a high Q. The capacity of the condenser 8 may be low at minimum and maximum values resulting in a small and inexpensive condenser.

In Fig. 3 there is shown a modified arrangement for improving the gain at the high frequency end of the tuning range as well as the gain at the low frequency end. The arrangement shown in Fig. 3 differs from that of Fig. 1 only in that an additional tube 20 is arranged to have its grid connected by lead 21 to the junction of coil 7 and condenser 8. The plate of tube 20 is connected to the opposite terminal of the primary winding 22 of the coupling transformer 23. The common cathode circuit of the tubes 2 and 20 is connected through the potential source 24 to the midpoint of primary winding 22. The following tunable circuit 25 is coupled to the primary winding 22, and there will be induced in circuit 25 the voltages developed across primary winding 22 by tubes 2 and 20. At the low frequency end of the tuning range the coil 7 is effective in transferring signal energy to circuit 25, the network then functioning in the manner explained above. However, at the high frequency end of the tuning range the condenser 8 predominates in transferring signal energy, and, therefore, tube 20 is more effective in delivering signal voltage to the circuit 25.

The modification shown in Fig. 4 differs from that shown in Fig. 1 only in that the additional shunt condenser 30 is employed. Condensers 8 and 30 can be provided by two sections of the antenna tuning condenser. By different proportioning of the capacity between the two sections maximum gain may be made to occur at any desired point in the frequency range. This is shown in Fig. 5 which qualitatively illustrates the type of "gain-frequency" response curve secured employing 100 mmf. as the maximum capacity for condenser 30 and about 400 mmf. as a maximum capacity of condenser 8. It will be observed that maximum gain occurs at approximately 900 kc.

While I have indicated and described several systems for carrying my invention into effect, it will be apparent to one skilled in the art that my invention is by no means limited to the particular organizations shown and described, but that many modifications may be made without departing from the scope of my invention, as set forth in the appended claims.

What I claim is:

1. A coupling network, adapted for use between a low capacity rod antenna and a radio receiver having two pairs of input terminals, comprising an adjustable inductive reactance connected between one pair of the input terminals of the receiver, and said reactance including in series relation therewith a small adjustable condenser for adjusting the magnitude of inductive reactance and the second pair of input terminals being connected across said condenser.

2. In combination with a rod antenna and a receiver of the automobile type, a coupling network comprising a coil in series with an adjustable condenser, said series coil and condenser being connected between the input electrodes of the first tube of the receiver, a conductor connecting said rod antenna to the terminal of the coil connected to the grid of said tube, and said series coil and condenser cooperating with the capacity of the rod antenna and the capacity between the conductor and ground to resonate the network to a desired signal frequency.

3. In combination with a rod signal collector spaced a sufficient distance from the chassis of an automobile to provide a low capacity antenna, a receiver provided with a first tube having its input electrodes connected between said rod signal collector and said chassis, and a coupling network resonant to a desired signal frequency connected in shunt between said input electrodes, said coupling network including a reactive circuit which is essentially inductive in reactance.

4. In combination with a rod signal collector spaced a sufficient distance from the chassis of an automobile to provide a low capacity antenna, a receiver provided with a first tube having its input electrodes connected between said rod signal collector and said chassis, and a coupling network resonant to a desired signal frequency connected in shunt between said input electrodes, said coupling network including a coil in series with an adjustable condenser connected between said input electrodes.

5. In combination with a rod antenna and a radio receiver which is tunable over a wide frequency range, a tube having input and output electrodes, a reactive path connected between the input electrodes and comprising a coil in series with an adjustable condenser, said reactive path having its constants chosen to series resonate it to selected operating frequencies of the frequency range and to provide high gain at the low frequency end of the tuning range.

6. In combination with a rod antenna and a radio receiver which is tunable over a wide frequency range, a tube having input and output electrodes, a reactive path connected between the input electrodes and comprising a coil in series with an adjustable condenser, said reactive path having its constants chosen to provide high gain at the low frequency end of the tuning range, a second tube having its output electrodes connected in opposition to the output electrodes of the first tube, and said reactive path including a connection between an input electrode of the second tube and the junction of said coil and condenser whereby the high frequency end of said tuning range has its response improved.

7. In combination with a rod antenna and a radio receiver which is tunable over a wide frequency range, a tube having input and output electrodes, a reactive path connected between the input electrodes and comprising a coil in series with an adjustable condenser, said reactive path having its constants chosen to provide high gain at the low frequency end of the tuning range, said reactive path cooperating with the capacities of the rod antenna and the lead-in wire to be series resonant to selected desired signal frequencies.

GARRARD MOUNTJOY.